US012646459B2

(12) United States Patent
Jeong et al.

(10) Patent No.: US 12,646,459 B2
(45) Date of Patent: Jun. 2, 2026

(54) PIXEL CIRCUIT AND DISPLAY APPARATUS HAVING THE SAME

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/883,870

(22) Filed: Sep. 12, 2024

(65) Prior Publication Data

US 2026/0073862 A1 Mar. 12, 2026

(30) Foreign Application Priority Data

Sep. 25, 2023 (KR) ........................ 10-2023-0128033

(51) Int. Cl.
*G09G 3/3233* (2016.01)

(52) U.S. Cl.
CPC ... *G09G 3/3233* (2013.01); *G09G 2300/0852* (2013.01); *G09G 2310/08* (2013.01); *G09G 2320/045* (2013.01)

(58) Field of Classification Search
CPC ......... G09G 3/3233; G09G 2300/0852; G09G 2310/08; G09G 2320/045
See application file for complete search history.

(56) References Cited

U.S. PATENT DOCUMENTS

| | | | | |
|---|---|---|---|---|
| 12,322,311 B2 * | 6/2025 | Park | ..................... | G09G 3/2096 |
| 2021/0248961 A1 * | 8/2021 | Yang | .................... | G09G 3/3266 |
| 2022/0319409 A1 * | 10/2022 | Park | ..................... | G09G 3/3266 |

FOREIGN PATENT DOCUMENTS

| | | |
|---|---|---|
| CN | 108806591 A | 11/2018 |
| JP | 2021128194 A | 9/2021 |

OTHER PUBLICATIONS

Kei Kimura, et al., "New pixel driving circuit using self-discharging compensation method for high resolution OLED micro displays on a silicon backplane", Journal of the SID 25/3, 2017, (10 pages).

* cited by examiner

*Primary Examiner* — Kenneth B Lee, Jr.
(74) *Attorney, Agent, or Firm* — CANTOR COLBURN LLP

(57) ABSTRACT

A pixel circuit includes a first transistor including a control electrode connected to a first node, a first electrode which receives the first power voltage and a second electrode connected to a third node, a second transistor including a control electrode which receives the first power voltage, a first electrode which receives the data voltage and a second electrode connected to a fourth node, a third transistor including a control electrode which receives the control signal, a first electrode connected to the third node and a second electrode connected to the first node and a fourth transistor including a control electrode which receives the control signal, a first electrode connected to the third node and a second electrode connected to a fifth node. The first power voltage has a first voltage level and a second voltage level.

20 Claims, 10 Drawing Sheets

110A

PIXEL CIRCUIT AND DISPLAY APPARATUS HAVING THE SAME

This application claims priority to Korean Patent Application No. 10-2023-0128033, filed on Sep. 25, 2023, and all the benefits accruing therefrom under 35 U.S.C. § 119, the content of which in its entirety is herein incorporated by reference.

BACKGROUND

1. Field

Embodiments of the invention relate to a pixel circuit and a display apparatus including the pixel circuit. More particularly, embodiments of the invention relate to the pixel circuit in which a threshold voltage is compensated.

2. Description of the Related Art

Generally, a display apparatus includes a display panel, a gate driver, a data driver and a driving controller. The display panel may include a plurality of gate lines, a plurality of data lines and a plurality of pixels electrically connected to the gate lines and the data lines. The gate driver provides gate signals to the gate lines, the data driver provides data voltages to the data lines and the driving controller controls the gate driver and the data driver.

Recently, a display apparatus which supports virtual reality (VR) or augmented reality (AR) have been developed. For this purpose, a low area and high integration of a display apparatus are required. In this case, a pitch occupied by the pixel circuit is narrowed, so that the number of transistors of the pixel circuit and the number of signals applied to the pixel circuit may be limited.

SUMMARY

Embodiments of the invention provide a pixel circuit having a low area and high integration and a reduced leakage current.

Embodiments of the invention also provide a display apparatus including the pixel circuit.

In an embodiment of a pixel circuit according to the invention, the pixel circuit includes a first transistor, a second transistor, a third transistor, a fourth transistor, a first capacitor, a second capacitor and a light emitting element. In such an embodiment, the first transistor includes a control electrode connected to a first node, a first electrode connected to a second node which receives a first power voltage and a second electrode connected to a third node. In such an embodiment, the second transistor includes a control electrode connected to the second node which receives the first power voltage, a first electrode which receives a data voltage and a second electrode connected to a fourth node. In such an embodiment, the third transistor includes a control electrode which receives a control signal, a first electrode connected to the third node and a second electrode connected to the first node. In such an embodiment, the fourth transistor includes a control electrode which receives the control signal, a first electrode connected to the third node and a second electrode connected to a fifth node. In such an embodiment, the first capacitor includes a first electrode connected to the second node which receives the first power voltage and a second electrode connected to the first node. In such an embodiment, the second capacitor includes a first electrode connected to the fourth node and a second electrode connected to the third node. In such an embodiment, the light emitting element includes an anode connected to the fifth node and a cathode which receives a second power voltage.

In an embodiment, the first power voltage may have a first voltage level and a second voltage level lower than the first voltage level.

In an embodiment, the third transistor may be an N-type transistor and the fourth transistor may be a P-type transistor.

In an embodiment, in a first period, the first power voltage may have the first voltage level and the control signal may have a logic high level such that the first transistor and the third transistor may be turned on.

In an embodiment, in a second period subsequent to the first period, the first power voltage may have the second voltage level and the control signal may have the logic high level.

In an embodiment, in the second period, the first transistor may be turned off.

In an embodiment, in a third period subsequent to the second period, the first power voltage may have the first voltage level and the control signal may have a logic low level.

In an embodiment, the third transistor may be a P-type transistor and the fourth transistor may be an N-type transistor.

In an embodiment, in a first period, the first power voltage may have the first voltage level and the control signal may have a logic low level.

In an embodiment, in a second period subsequent to the first period, the first power voltage may have the second voltage level and the control signal may have the logic low level.

In an embodiment, in the second period, the first transistor may be turned off.

In an embodiment, in a third period subsequent to the second period, the first power voltage may have the first voltage level and the control signal may have a logic high level.

In an embodiment of a pixel circuit according to the invention, the pixel circuit includes a light emitting element, a first transistor, a second transistor, a third transistor, a fourth transistor, a first capacitor and a second capacitor. In such an embodiment, the first transistor applies a first power voltage to a third node in response to a voltage of a first node. In such an embodiment, the second transistor applies a data voltage to a fourth node in response to a voltage of a second node. In such an embodiment, the third transistor applies a voltage of a third node to the first node in response to a control signal. In such an embodiment, the fourth transistor applies the voltage of the third node to the light emitting element in response to the control signal. In such an embodiment, the first capacitor is connected to the first node and the second node. In such an embodiment, the second capacitor is connected to the third node and the fourth node. In such an embodiment, the first power voltage has a first voltage level and a second voltage level lower than the first voltage level.

In an embodiment, the third transistor may be an N-type transistor and the fourth transistor may be a P-type transistor.

In an embodiment, the third transistor may be a P-type transistor and the fourth transistor may be an N-type transistor.

In an embodiment of a display apparatus according to the invention, the display apparatus includes a display panel, a data driver and a gate driver. In such an embodiment, the display driver includes a pixel circuit. In such an embodiment, the data driver applies a data voltage to the pixel circuit. In such an embodiment, the gate driver applies a control signal and a first power voltage to the pixel circuit. In such an embodiment, the pixel circuit includes a first transistor including a control electrode connected to a first node, a first electrode connected to a second node which receives the first power voltage and a second electrode connected to a third node, a second transistor including a control electrode connected to the second node which receives the first power voltage, a first electrode which receives the data voltage and a second electrode connected to a fourth node, a third transistor including a control electrode which receives the control signal, a first electrode connected to the third node and a second electrode connected to the first node, a fourth transistor including a control electrode which receives the control signal, a first electrode connected to the third node and a second electrode connected to a fifth node, a first capacitor including a first electrode connected to the second node which receive the first power voltage and a second electrode connected to the first node, a second capacitor including a first electrode connected to the fourth node and a second electrode connected to the third node and a light emitting element including an anode connected to the fifth node and a cathode which receives a second power voltage. In such an embodiment, the first power voltage has a first voltage level and a second voltage level lower than the first voltage level.

In an embodiment, the third transistor may be an N-type transistor and the fourth transistor may be a P-type transistor.

In an embodiment, in a first period, the first power voltage may have the first voltage level and the control signal may have a logic high level.

In an embodiment, in a second period subsequent to the first period, the first power voltage may have the second voltage level and the control signal may have the logic high level. In a third period subsequent to the second period, the first power voltage may have the first voltage level and the control signal may have a logic low level.

In an embodiment, the pixel circuit may be disposed on a silicon-based substrate.

According to embodiments of the pixel and the display apparatus described herein, the number of transistors and the number of capacitors of a pixel circuit may be reduced, such that an integration of the pixel circuit may be improved and a power consumption may be reduced. In such embodiments, one of transistors in the pixel circuit may be an N-type transistor, such that a leakage current of the pixel circuit may be reduced, so that reliability and stability of the pixel circuit may be improved.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION OF THE EMBODIMENTS

Figure 1:
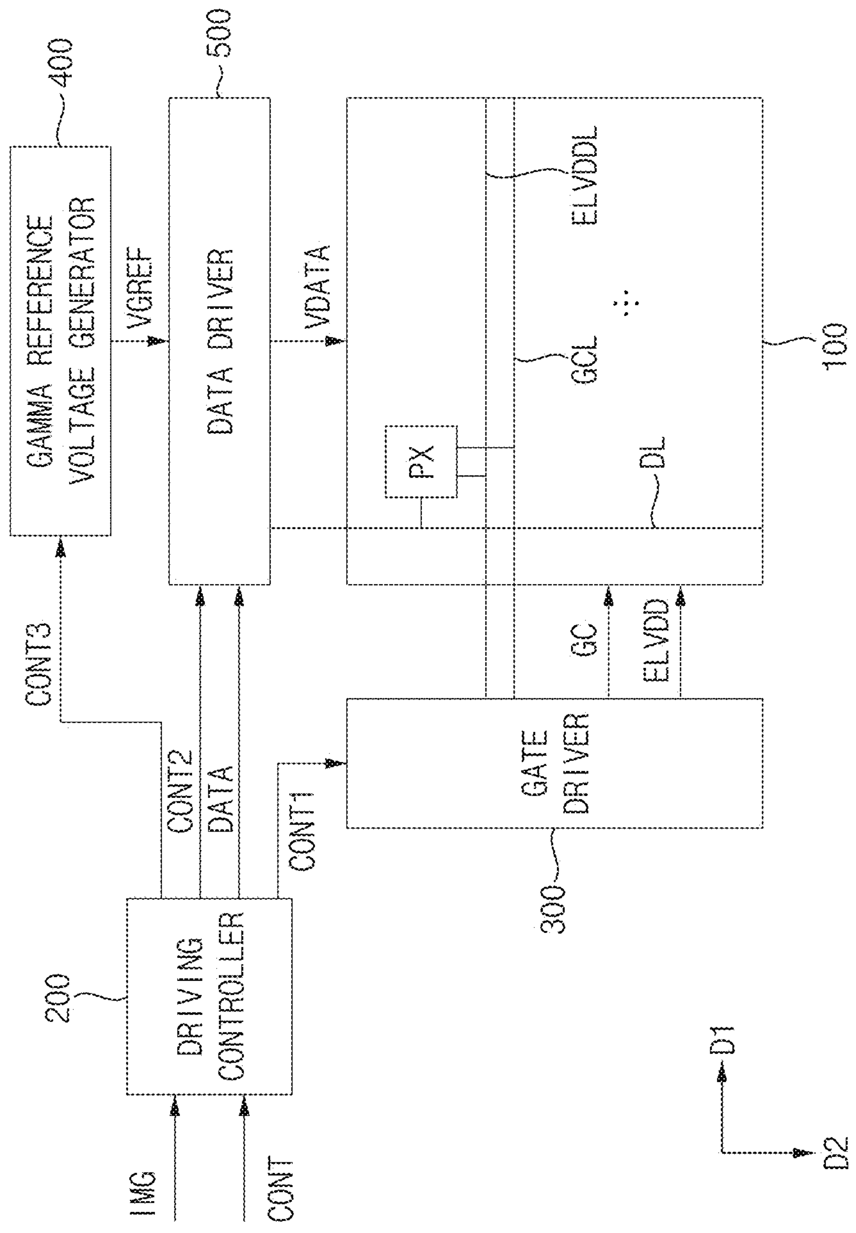
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400 and a data driver 500.

The display panel 100 may include a display region configured to display an image and a peripheral region that is adjacent to the display region.

The display panel 100 includes a plurality of gate lines GCL and ELVDDL a data line DL and a pixel circuit PX electrically connected to the gate lines GCL and ELVDDL and the data line DL respectively. The gate lines GCL and ELVDDL may extend in a first direction D1, the data line DL may extend in a second direction D2 crossing the first direction D1.

The driving controller 200 receives input image data IMG and an input control signal CONT from an external device. In an embodiment, for example, the input image data IMG may include red image data, green image data and blue image data. In such an embodiment, the input image data IMG may further include white image data. In another embodiment, the input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT and outputs the generated first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the generated second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the generated third control signal CONT3 to the gamma reference voltage generator 400.

The gate driver 300 generates a control signal GC and a first power voltage ELVDD for driving the gate lines GCL and ELVDDL in response to the first control signal CONT1 received from the driving controller 200. The gate driver 300 may output the control signal GC and the first power voltage ELVDD to the gate lines GL, ELVDDL respectively. In an embodiment, the first power voltage ELVDD may have a first voltage level VGH (shown in FIG. 3) and a second voltage level VGL of FIG. 3 lower than the first voltage level VGH (shown in FIG. 3).

In an embodiment of the invention, the gate driver 300 may be integrated on the peripheral region of the display panel 100. In an embodiment of the invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

In an embodiment, for example, the gamma reference voltage generator 400 may be disposed in the driving controller 200 or in the data driver 500.

The data driver 500 receives the second control signal CONT2 and the data signal DATA from the driving controller 200 and receives the gamma reference voltage VGREF from the gamma reference voltage generator 400. The data driver 500 converts the data signal DATA into an analog form of a data voltage VDATA by using the gamma reference voltage VGREF.

In an embodiment of the invention, the data driver 500 may be integrated on the peripheral region of the display panel 100. In an embodiment of the invention, the data driver 500 may be mounted on the peripheral region of the display panel 100.

Figure 2:
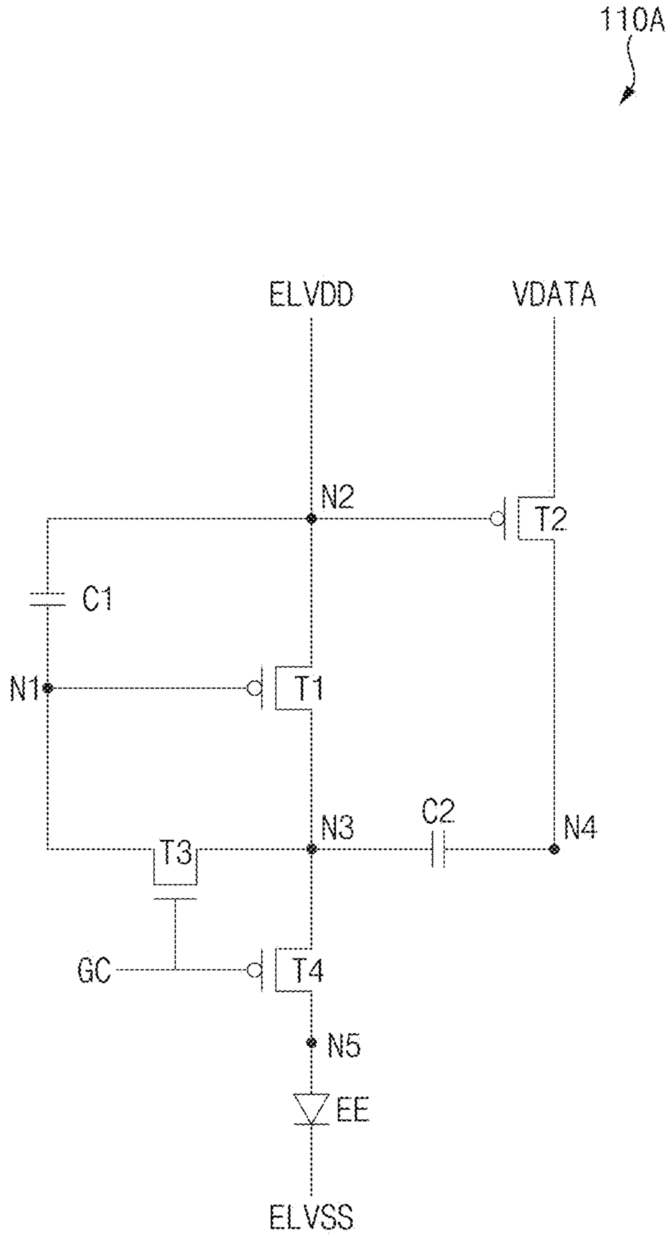
FIG. 2 is a circuit diagram illustrating a pixel circuit of a display panel of FIG. 1.

FIG. 2 is a circuit diagram illustrating a pixel circuit 110A of a display panel 100 of FIG. 1.

Referring to FIG. 2, in an embodiment, the pixel circuit 110A may include a first transistor T1, a second transistor T2, a third transistor T3, a fourth transistor T4, a first capacitor C1, a second capacitor C2 and a light emitting element EE. The pixel circuit 110A may have a four-transistor-two-capacitor (4T2C) structure including four transistors and two capacitors.

The first transistor T1 may include a control electrode connected to a first node N1, a first electrode connected to a second node N2 and a second electrode connected to a third node N3. The first transistor T1 may apply the first power voltage ELVDD to the third node N3 in response to a voltage of the first node N1. Additionally, the first transistor T1 may generate a driving current for driving the light emitting element EE in response to the voltage of the first node N1.

The second transistor T2 may include a control electrode connected to the second node N2, a first electrode configured to (or connected to) receive the data voltage VDATA and a second electrode connected to a fourth node N4. The second transistor T2 may apply the data voltage VDATA to the fourth node N4 in response to a voltage of the second node N2.

The third transistor T3 may include a control electrode configured to receive the control signal GC, a first electrode connected to the third node N3 and a second electrode connected to the first node N1. The third transistor T3 may apply a voltage of the third node N3 to the first node N1 in response to the control signal GC.

The fourth transistor T4 may include a control electrode configured to receive the control signal GC, a first electrode connected to the third node N3 and a second electrode connected to a fifth node N5. The fourth transistor T4 may apply the driving current to the light emitting element EE in response to the control signal GC.

One of the third transistor T3 and the fourth transistor T4 may be an N-type transistor and the other of the third transistor T3 and the fourth transistor T4 may be a P-type transistor. In an embodiment, the third transistor T3 may be an N-type transistor and the fourth transistor may be a P-type transistor. In such an embodiment, the first transistor T1 and the second transistor T2 may be P-type transistors.

In an embodiment, for example, the first transistor T1, the second transistor T2 and the fourth transistor T4 may be polysilicon thin film transistors. In an embodiment, for example, the first transistor T1, the second transistor T2 and the fourth transistor T4 may be low temperature polysilicon (LTPS) thin film transistors. In an embodiment, for example, the third transistor T3 may be an oxide thin film transistor.

A conventional pixel circuit receives a plurality of gate signals. An embodiment of the pixel circuit 110A according to the invention may operate in response to the control signal GC. Accordingly, in such an embodiment, the pixel circuit 110A may operate with a small number of signals, such that the integration of the pixel circuit 110A may be improved. Additionally, in such an embodiment, an absolute value of a threshold voltage of an N-type transistor is lower than an absolute value of a threshold voltage of a P-type transistor generally, such that a leakage current may be reduced. Accordingly, in such an embodiment, one of the third transistor T3 and the fourth transistor T4 of the pixel circuit 110A may be an N-type transistor, such that a leakage current flowing through the pixel circuit 110A may be reduced, and reliability and stability of pixel circuit 110A may be improved.

The first capacitor C1 may include a first electrode configured to receive the first power voltage ELVDD and a second electrode connected to the first node N1. The first capacitor C1 may store the voltage of the first node N1.

The second capacitor C2 may include a first electrode connected to the fourth node N4 and a second electrode connected to the third node N3. The second capacitor C2 may apply a coupling voltage to the third node N3 by coupling a voltage of the fourth node N4 thereto.

The light emitting element EE may include an anode connected to the fifth node N5 and a cathode configured to receive a second power voltage ELVSS. The second power voltage ELVSS may be lower than the first voltage level VGH. In an embodiment, the light emitting element EE may be an organic light emitting diode. However, the invention is not limited thereto. In another embodiment, the light emitting element EE may be a nano light emitting diode, a quantum dot light emitting diode, a micro light emitting diode and an inorganic light emitting diode, or any other suitable light emitting elements.

In an embodiment, the pixel circuit 110A may be formed on a silicon-based substrate. Accordingly, the first power voltage ELVDD may output stably between the first voltage level VGH and the second voltage level VGL. Additionally, the pixel circuit 110A may be formed on a silicon-based substrate, so that one of the third transistor T3 and the fourth transistor T4 may be formed as an N-type transistor stably.

Figure 3:
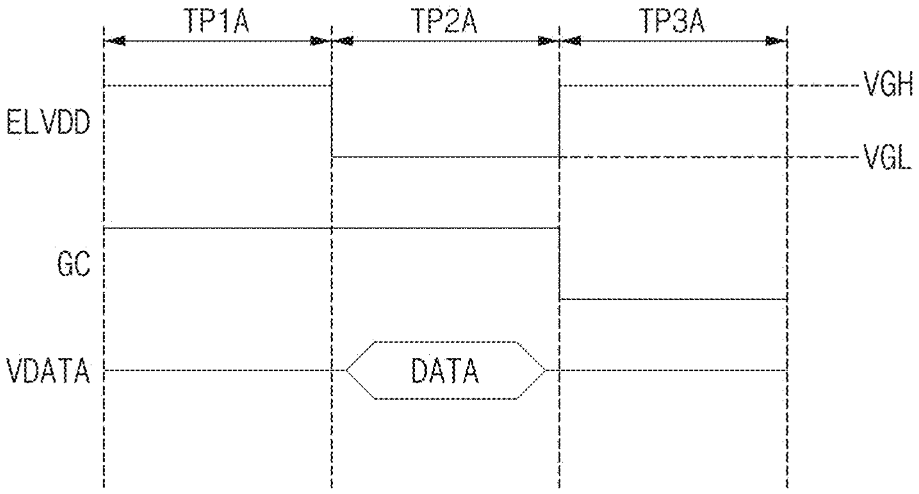
FIG. 3 is a signal timing diagram illustrating input signals applied to the pixel circuit of FIG. 2.
Figure 4:
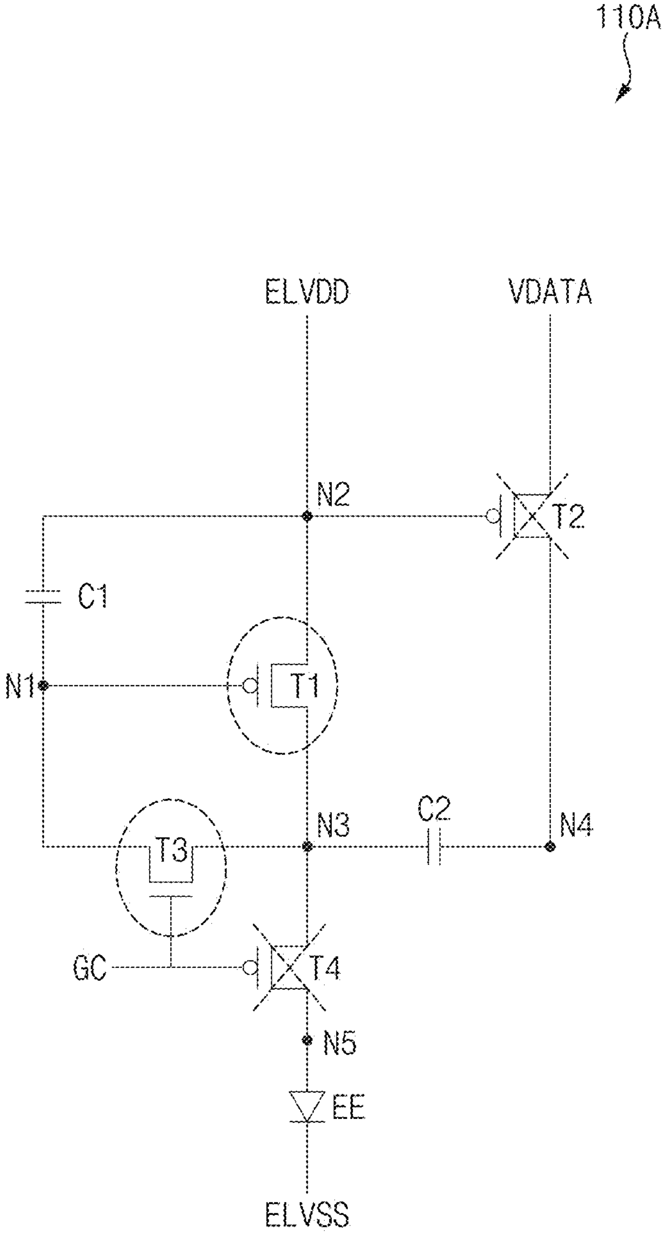
FIG. 4 is a circuit diagram illustrating an operation of the pixel circuit of FIG. 2 in a first period of FIG. 3.
Figure 5:
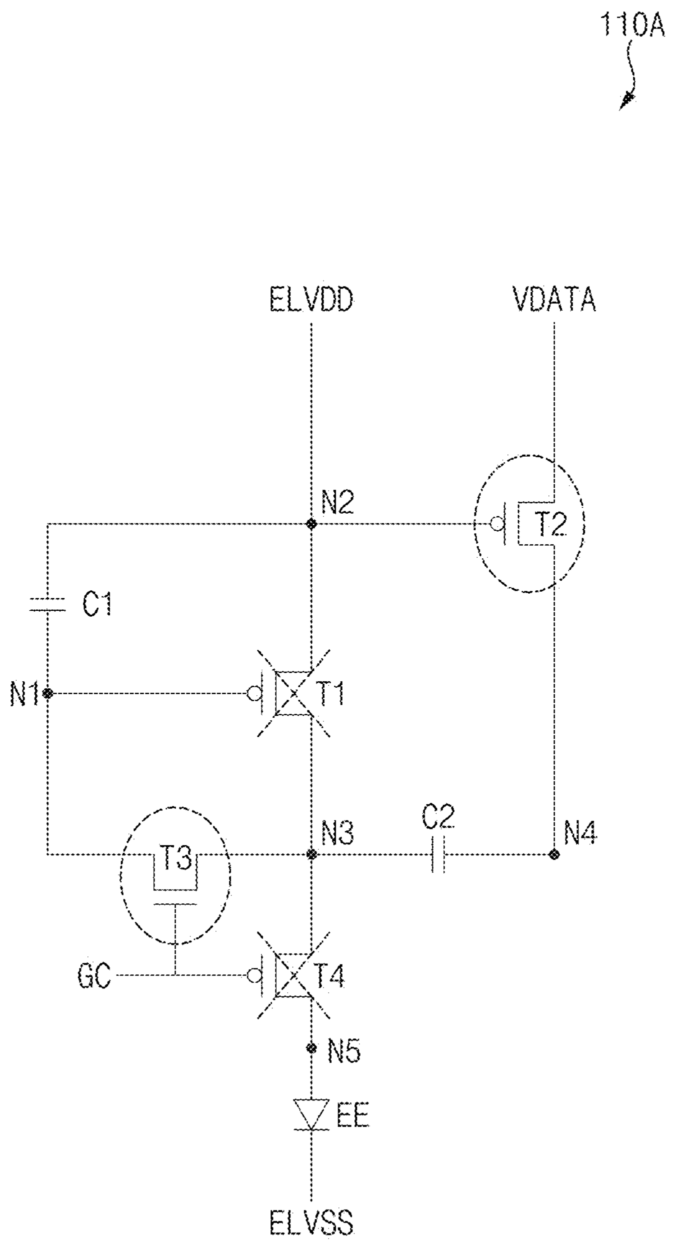
FIG. 5 is a circuit diagram illustrating an operation of the pixel circuit of FIG. 2 in a second period of FIG. 3.
Figure 6:
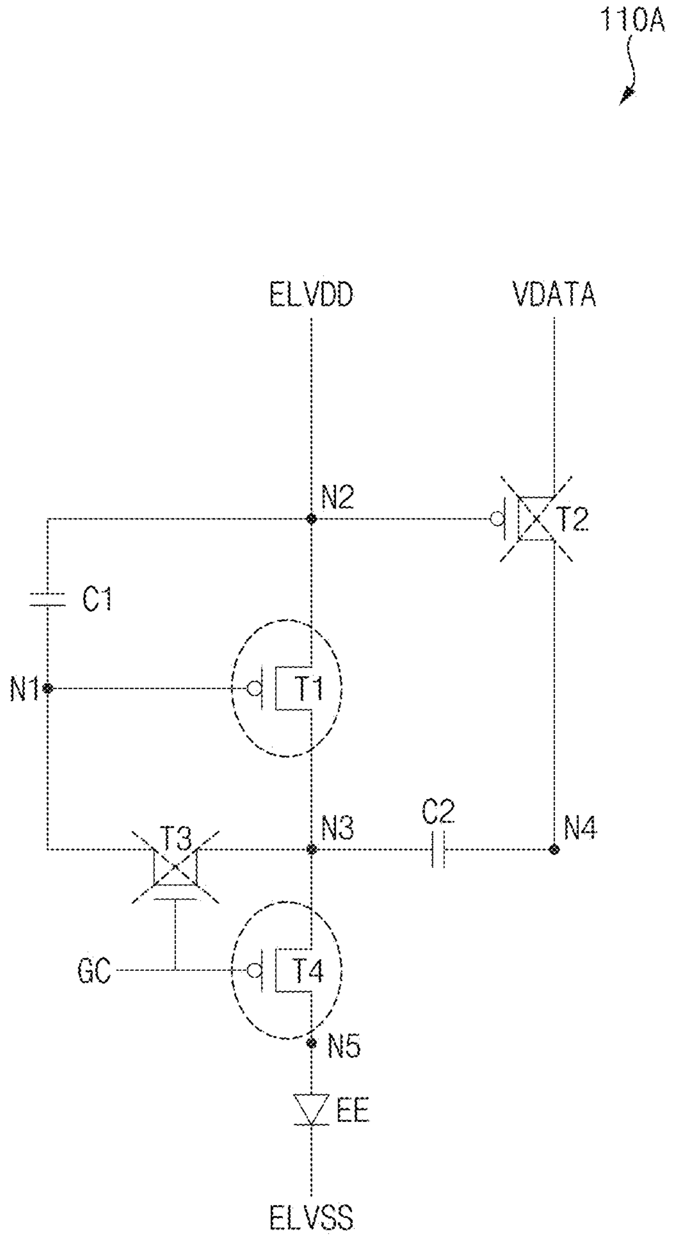
FIG. 6 is a circuit diagram illustrating an operation of the pixel circuit of FIG. 2 in a third period of FIG. 3.

FIG. 3 is a signal timing diagram illustrating input signals applied to the pixel circuit 110A of FIG. 2. FIG. 4 is a circuit diagram illustrating an operation of the pixel circuit 110A of FIG. 2 in a first period TP1A of FIG. 3. FIG. 5 is a circuit diagram illustrating an operation of the pixel circuit 110A of FIG. 2 in a second period TP2A of FIG. 3. FIG. 6 is a circuit diagram illustrating an operation of the pixel circuit 110A of FIG. 2 in a third period TP3A of FIG. 3.

Referring to FIG. 3, in an embodiment, for example, the first power voltage ELVDD may have the first voltage level VGH and the second voltage level VGL.

In an embodiment of the pixel circuit 110A according to the invention, the first power voltage ELVDD of the pixel circuit 110A has the first voltage level VGH and the second voltage level VGL lower than the first voltage level VGH as shown in FIG. 3, such that the number of signals to be applied to the pixel circuit 110A may be decreased. Accordingly, a power consumption of the pixel circuit 110A may be reduced and the integration of the pixel circuit 110A may be improved.

Referring to FIG. 3 and FIG. 4, a first period TP1A of a frame period may be an initialization and compensation period.

In the first period TP1A, the first power voltage ELVDD may have the first voltage level VGH and the control signal GC may have a logic high level. In an embodiment, for example, the logic high level is a voltage level at which an N-type transistor is turned on and a P-type transistor is turned off. In an embodiment, for example, a logic low level is a voltage level at which an N-type transistor is turned off and a P-type transistor is turned on.

In the first period TP1A, as shown in FIG. 4, the first transistor T1 may be turned on. In the first period TP1A, the second transistor T2 may be turned off in response to the first voltage level VGH of the first power voltage ELVDD, the third transistor T3 may be turned on in response to the logic high level of the control signal GC, and the fourth transistor T4 may be turned off in response to the logic high level of the control signal GC. The light emitting element EE may not emit the light as the fourth transistor T4 is turned off. The first transistor T1 and the third transistor T3 may be turned on, so that the third transistor T3 may diode-connect the first transistor T1, i.e., connect the first transistor T1 in a diode form. Accordingly, the voltage of the first node N1 may be a sum of the data voltage VDATA and a threshold voltage of the first transistor T1 through a diode-connection of the first transistor T1. Additionally, the first electrode of the first capacitor C1 may receive the first power ELVDD and a voltage of the second electrode of the first capacitor C1 may be the voltage of the first node N1, which is the sum of the threshold voltage of the first transistor T1 and the data voltage VDATA, so that a voltage including the threshold voltage component of the first transistor T1 and the first voltage level VGH may be stored between the first and second electrodes of the first capacitor C1.

Referring to FIG. 3 and FIG. 5, a second period TP2A of the frame period may be a writing period.

In the second period TP2A, the first power voltage ELVDD may have the second voltage level VGL and the control signal GC may have the logic high level.

In the second period TP2A, the second transistor T2 may be turned on in response to the second voltage level VGL of the first power voltage ELVDD. The second transistor T2 may be turned on, so that the data voltage VDATA may be applied to the fourth node N4. The second capacitor C2 may couple a voltage of the fourth node N4 to the third node N3 to apply the coupling voltage to the third node N3. The third transistor T3 may maintain a turned-on state in response to the logic high level of the control signal GC. The third transistor T3 may maintain a turned-on state, so that the third transistor T3 may apply a voltage of the third node N3 to the first node N1. Accordingly, the voltage including the threshold voltage component of the first transistor T1 and the data voltage VDATA may be stored between the first and second electrodes of the first capacitor C1.

In an embodiment, the pixel circuit 110A may be disposed on a silicon-based substrate, such that the first voltage level VGH and the second voltage level VGL of the first power voltage ELVDD may be set more precisely. Accordingly, in such an embodiment, in the second period TP2A, the second voltage level VGL may be set to a voltage level for turning off the first transistor T1.

Referring to FIG. 3 and FIG. 6, a third period TP3A of the frame period may be an emitting period.

In the third period TP3A, the first power voltage ELVDD may have the first voltage level VGH and the control signal GC may have the logic low level.

In the third period TP3A, the first transistor T1 may generate the driving current based on a voltage of the first node N1 which is in the second period TP2A. In the third period TP3A, the first transistor T1 may be turned on based on the first voltage level VGH of the first power voltage ELVDD. The third transistor T3 may be turned off in response to the logic low level of the control signal GC. The fourth transistor T4 may be turned on in response to the logic low level of the control signal GC. The fourth transistor T4 may be turned on, such that a voltage of the third node N3 may be applied to the fifth node N5. Accordingly, in the third period TP3A, the light emitting element EE may emit the light based on a voltage of the fifth node N5 and the driving current.

The pixel circuit 110A according to an embodiment may receive a small number of signals compared to a conventional pixel circuit. In an embodiment, the number of transistors and the number of capacitors of the pixel circuit 110A may be decreased compared to the conventional pixel circuit. Accordingly, the integration of the pixel circuit 110A may be improved and a power consumption may be reduced.

In the driving timing of the pixel circuit 110A according to an embodiment, the initialization and compensation period TP1A and the writing period TP2A may be separated, such that the pixel circuit 110A may operate effectively in high-speed driving.

Figure 7:
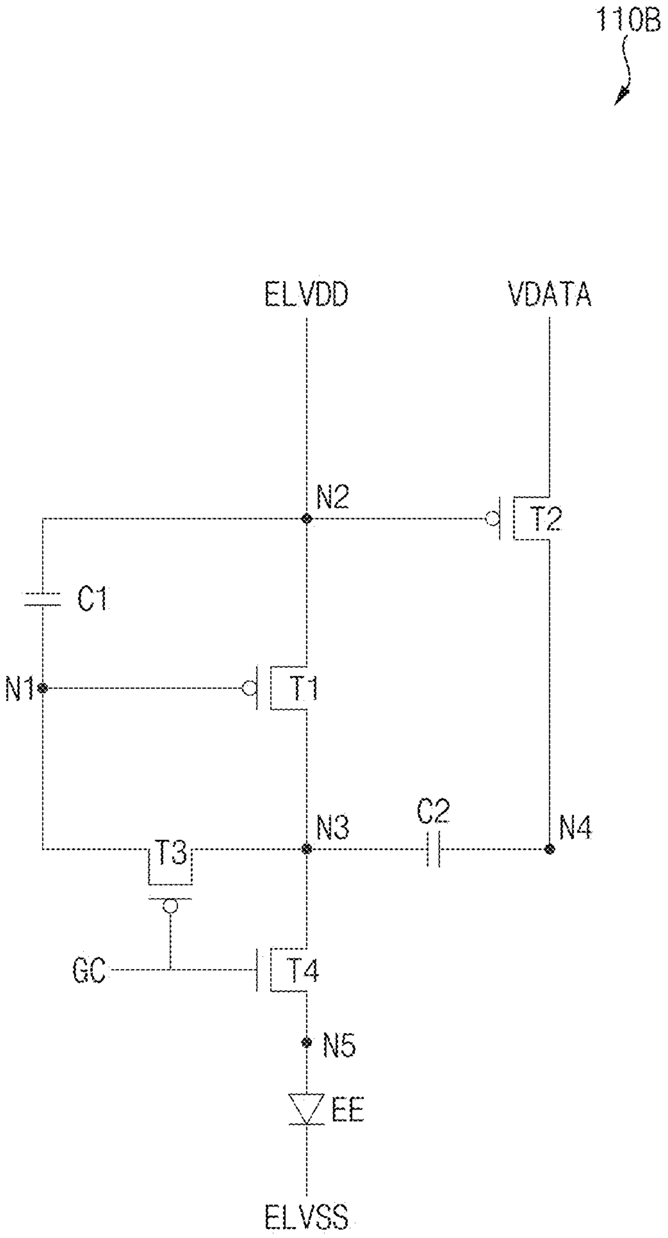
FIG. 7 is a circuit diagram illustrating a pixel circuit according to an embodiment of the invention.

FIG. 7 is a circuit diagram illustrating a pixel circuit 110B according to an embodiment of the invention.

The pixel circuit 110B according to an embodiment shown in FIG. 7 is substantially the same as the pixel circuit 110A of the embodiment described above referring to FIG. 2 except that the third transistor T3 is not an N-type transistor but a P-type transistor and the fourth transistor T4 is not a P-type transistor but an N-type transistor. Thus, the same reference numerals will be used to refer to the same or like parts as those of the embodiment of FIG. 2 described above and any repetitive detailed description thereof will be omitted.

Referring to FIG. 7, in an embodiment, one of the third transistor T3 and the fourth transistor T4 may be an N-type transistor and the other may be a P-type transistor. In an embodiment, the third transistor T3 may be a P-type transistor and the fourth transistor may be an N-type transistor. In such an embodiment, the first transistor T1 and the second transistor T2 may be P-type transistors.

Figure 8:
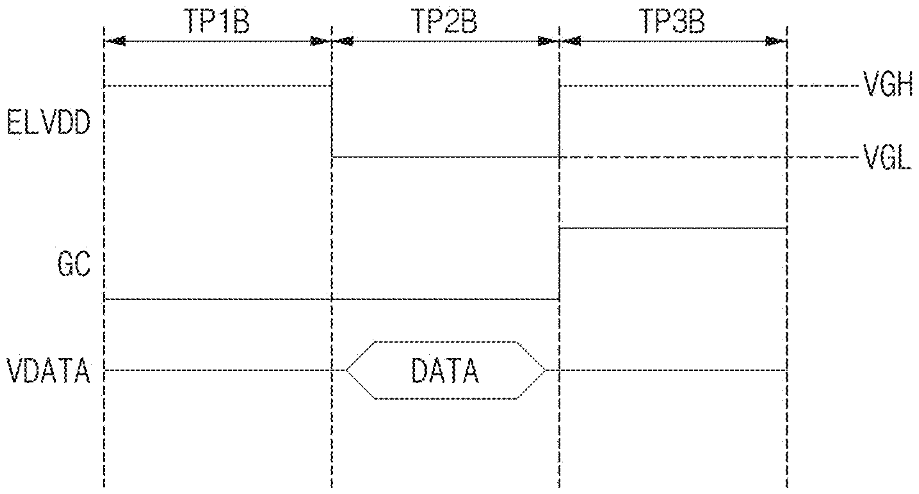
FIG. 8 is a signal timing diagram illustrating input signals applied to the pixel circuit of FIG. 7.

FIG. 8 is a signal timing diagram illustrating input signals applied to the pixel circuit 110B of FIG. 7.

A signal timing diagram of FIG. 8 may include a first period TP1B, a second period TP2B and a third period TP3B in a frame period. The signal timing diagram of FIG. 8 may be substantially the same as the signal timing diagram of FIG. 3, except that the control signal GC has the logic low level in the first period TP1B and the second period TP2B and the control signal GC has the logic high level in the third period TP3B. Thus, the same reference numerals will be used to refer to the same or like parts as of the embodiment of FIG. 3 described above and any repetitive detailed description thereof will be omitted.

The pixel circuit 110B according to an embodiment may receive a small number of signals compared to a conventional pixel circuit. In such an embodiment, the number of transistors and the number of capacitors of pixel circuit 110B may be decreased compared to the conventional pixel circuit. Accordingly, in such an embodiment, the integration of the pixel circuit 110B may be improved and the power consumption may be reduced. In an embodiment, an absolute value of a threshold voltage of an N-type transistor is lower than an absolute value of a threshold voltage of a P-type transistor generally, such that a leakage current may be reduced. Accordingly, one of the third transistor T3 and the fourth transistor T4 of the pixel circuit 110B according to an embodiment of the invention may be an N-type transistor, such that a leakage current flowing through the pixel circuit 110B may be reduced. Accordingly, reliability and stability of pixel circuit 110B may be improved.

In the driving timing of the pixel circuit 110B according to an embodiment, the initialization and compensation period TP1B and the writing period TP2B may be separated, such that the pixel circuit 110B may operate effectively in high-speed driving.

Figure 9:
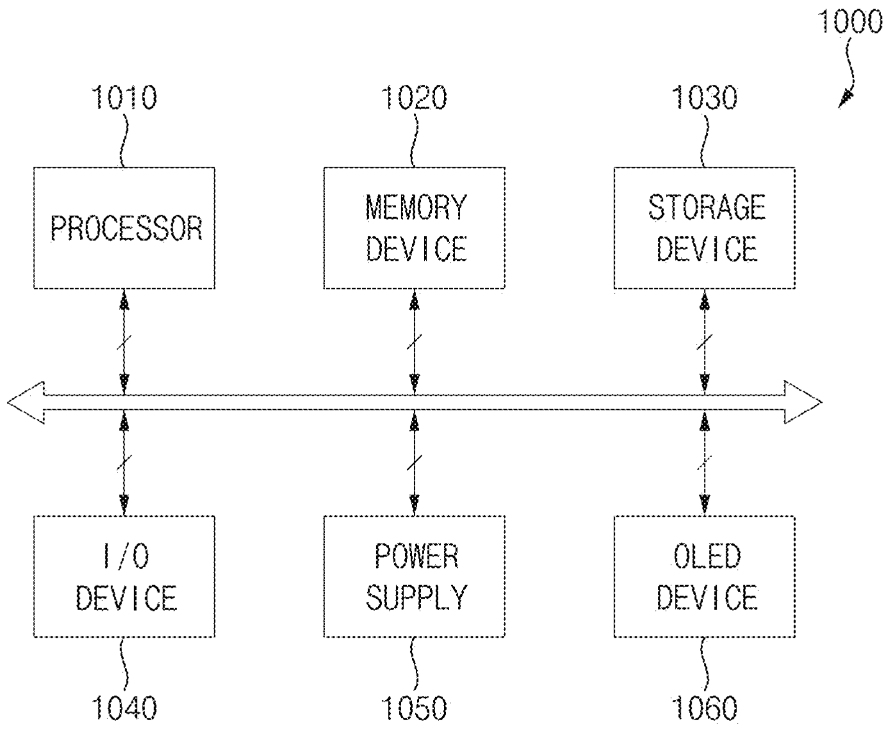
FIG. 9 is a block diagram illustrating an electronic apparatus according to an embodiment of the invention.
Figure 10:
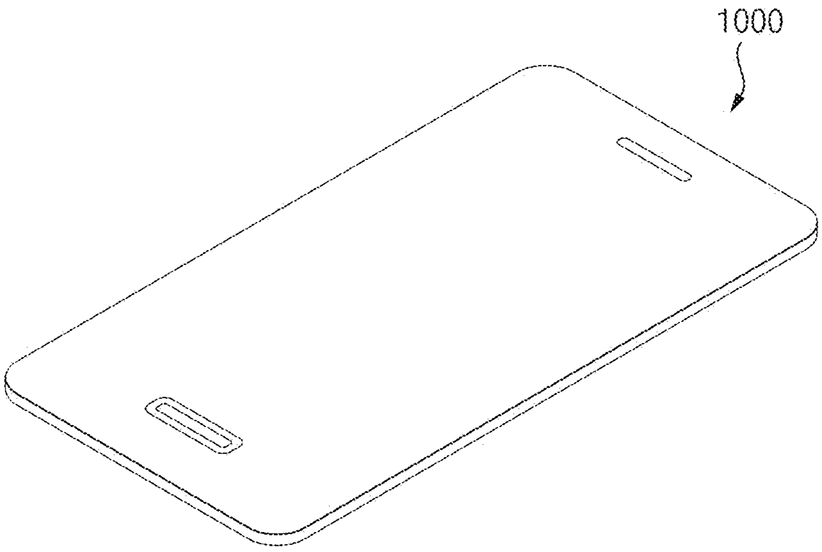
FIG. 10 is a diagram illustrating an example in which the electronic apparatus of FIG. 9 is implemented as a smart phone.

FIG. 9 is a block diagram illustrating an electronic apparatus according to an embodiment of the invention. FIG. 10 is a diagram illustrating an example in which the electronic apparatus of FIG. 9 is implemented as a smart phone.

Referring to FIG. 9 and FIG. 10, an embodiment of the electronic apparatus 1000 may include a processor 1010, a memory device 1020, a storage device 1030, an input/output (I/O) device 1040, a power supply 1050 and an OLED device 1060. In such an embodiment, the OLED device 1060 may correspond to the display apparatus of FIG. 1. In addition, the electronic apparatus 1000 may further include a plurality of ports for communicating with a video card, a sound card, a memory card, a universal serial bus (USB) apparatus, other electronic apparatuses, etc.

According to an embodiment, as shown in FIG. 10, the electronic apparatus 1000 may be implemented as a smart phone. However, the electronic apparatus 1000 is not limited thereto. In an embodiment, for example, the electronic apparatus 1000 may be implemented as a cellular phone, a video phone, a smart pad, a smart watch, a tablet computer, a car navigation system, a computer monitor, a laptop, a head mounted display (HMD) apparatus, and the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory apparatus 1020 may store data for operations of the electronic apparatus 1000. For example, the memory apparatus 1020 may include at least one non-volatile memory apparatus such as an erasable programmable read-only memory (EPROM) apparatus, an electrically erasable programmable read-only memory (EEPROM) apparatus, a flash memory apparatus, a phase change random access memory (PRAM) apparatus, a resistance random access memory (RRAM) apparatus, a nano floating gate memory (NFGM) apparatus, a polymer random access memory (PoRAM) apparatus, a magnetic random access memory (MRAM) apparatus, a ferroelectric random access memory (FRAM) apparatus, or the like and/or at least one volatile memory apparatus such as a dynamic random access memory (DRAM) apparatus, a static random access memory (SRAM) apparatus, a mobile DRAM apparatus, or the like.

The storage apparatus 1030 may include a solid state drive (SSD) apparatus, a hard disk drive (HDD) apparatus, a CD-ROM apparatus, or the like. The I/O device 1040 may include an input apparatus such as a keyboard, a keypad, a mouse apparatus, a touch-pad, a touch-screen, and the like and an output apparatus such as a printer, a speaker, or the like. In some embodiments, the OLED device 1060 may be included in the I/O device 1040. The power supply 1050 may provide power for operations of the electronic apparatus 1000. The OLED device 1060 may be coupled to other components via the buses or other communication links.

Figure 11:
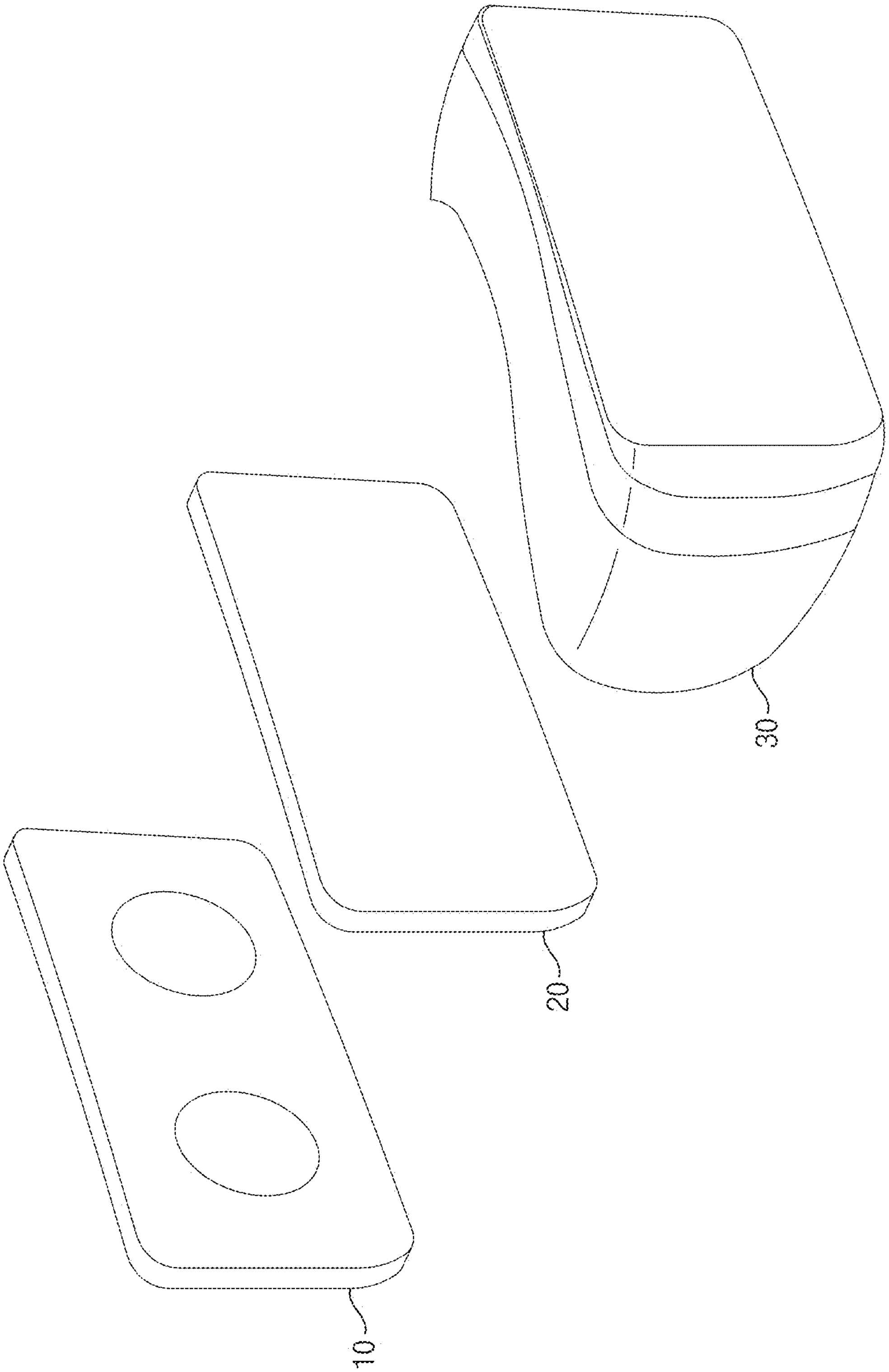
FIG. 11 is a diagram illustrating an example in which the electronic apparatus of FIG. 9 is implemented as a virtual reality display system.

FIG. 11 is a diagram illustrating an example in which the electronic apparatus of FIG. 9 is implemented as a virtual reality display system.

Referring to FIG. 9 and FIG. 11, the virtual reality display system may include a lens unit 10, a display apparatus 20 and a housing 30. The display apparatus 20 is disposed adjacent to the lens unit 10. The housing 30 may receive the lens unit 10 and the display apparatus 20. Although an embodiment where the lens unit 10 and the display apparatus 20 are received in a first side of the housing 30 is shown in FIG. 11, the invention may not be limited thereto. Alternatively, the lens unit 10 may be received in a first side of the housing 30 and the display apparatus may be received in a second side of the housing 30. In an embodiment where the lens unit 10 and the display apparatus 20 are received in the housing 30 in opposite sides, the housing 30 may have a transmission area to transmit a light.

In an embodiment, for example, the virtual reality display system may be a head mounted display system which is wearable on a head of a user. Although not shown in figures, the virtual reality display system may further include a head band to fix the virtual reality display system on the head of the user.

Alternatively, the virtual reality display system may have the form of smart glasses implemented in the shape of glasses.

Additionally, the electronic apparatus may be implemented as an augmented reality display system, a mixed reality display system, or an extended reality display system.

The display apparatus according to embodiments may be applied to an electronic apparatus, for example, a digital television (TV), a three-dimensional (3D) TV, a smart phone, a tablet computer, a virtual reality (VR) apparatus, an augmented reality (AR) apparatus, a computer, a notebook, a personal digital assistant (PDA), an MP3 player, a portable media player (PMP), a digital camera, a music player, a portable game console, a navigation or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:

a first transistor including a control electrode connected to a first node, a first electrode connected to a second node which receives a first power voltage and a second electrode connected to a third node;

a second transistor including a control electrode connected to the second node which receives the first power voltage, a first electrode which receives a data voltage and a second electrode connected to a fourth node;

a third transistor including a control electrode which receives a control signal, a first electrode connected to the third node and a second electrode connected to the first node;

a fourth transistor including a control electrode which receives the control signal, a first electrode connected to the third node and a second electrode connected to a fifth node;

a first capacitor including a first electrode connected to the second node which receives the first power voltage and a second electrode connected to the first node;

a second capacitor including a first electrode connected to the fourth node and a second electrode connected to the third node; and a light emitting element including an anode connected to the fifth node and a cathode which receives a second power voltage.

2. The pixel circuit of claim 1, wherein the first power voltage has a first voltage level and a second voltage level lower than the first voltage level.

3. The pixel circuit of claim 2, wherein the third transistor is an N-type transistor and wherein the fourth transistor is a P-type transistor.

4. The pixel circuit of claim 3, wherein in a first period, the first power voltage has the first voltage level and the control signal has a logic high level such that the first transistor and the third transistor are turned on.

5. The pixel circuit of claim 4, wherein in a second period subsequent to the first period, the first power voltage has the second voltage level and the control signal has the logic high level.

6. The pixel circuit of claim 5, wherein in the second period, the first transistor is turned off.

7. The pixel circuit of claim 5, wherein in a third period subsequent to the second period, the first power voltage has the first voltage level and the control signal has a logic low level.

8. The pixel circuit of claim 2, wherein the third transistor is a P-type transistor and wherein the fourth transistor is an N-type transistor.

9. The pixel circuit of claim 8, wherein in a first period, the first power voltage has the first voltage level and the control signal has a logic low level.

10. The pixel circuit of claim 9, wherein in a second period subsequent to the first period, the first power voltage has the second voltage level and the control signal has the logic low level.

11. The pixel circuit of claim 10, wherein in the second period, the first transistor is turned off.

12. The pixel circuit of claim 10, wherein in a third period subsequent to the second period, the first power voltage has the first voltage level and the control signal has a logic high level.

13. A pixel circuit comprising:

a light emitting element;

a first transistor which applies a first power voltage to a third node in response to a voltage of a first node;

a second transistor which applies a data voltage to a fourth node in response to a voltage of a second node;

a third transistor which applies a voltage of the third node to the first node in response to a control signal;

a fourth transistor which applies the voltage of the third node to the light emitting element in response to the control signal;

a first capacitor connected to the first node and the second node; and a second capacitor connected to the third node and the fourth node, wherein the first power voltage has a first voltage level and a second voltage level lower than the first voltage level.

14. The pixel circuit of claim 13, wherein the third transistor is an N-type transistor and wherein the fourth transistor is a P-type transistor.

15. The pixel circuit of claim 13, wherein the third transistor is a P-type transistor and wherein the fourth transistor is an N-type transistor.

16. A display apparatus comprising:

a display panel including a pixel circuit;

a data driver which applies a data voltage to the pixel circuit; and a gate driver which applies a control signal and a first power voltage to the pixel circuit, wherein the pixel circuit comprises:

a first transistor including a control electrode connected to a first node, a first electrode connected to a second node which receives the first power voltage and a second electrode connected to a third node;

a second transistor including a control electrode connected to the second node which receives the first power voltage, a first electrode which receives the data voltage and a second electrode connected to a fourth node;

a third transistor including a control electrode which receives the control signal, a first electrode connected to the third node and a second electrode connected to the first node;

a fourth transistor including a control electrode which receives the control signal, a first electrode connected to the third node and a second electrode connected to a fifth node;

a first capacitor including a first electrode connected to the second node which receives the first power voltage and a second electrode connected to the first node;

a second capacitor including a first electrode connected to the fourth node and a second electrode connected to the third node; and a light emitting element including an anode connected to the fifth node and a cathode which receives a second power voltage, wherein the first power voltage has a first voltage level and a second voltage level lower than the first voltage level.

17. The display apparatus of claim 16, wherein the third transistor is an N-type transistor and wherein the fourth transistor is a P-type transistor.

18. The display apparatus of claim 17, wherein in a first period, the first power voltage has the first voltage level and the control signal has a logic high level.

19. The display apparatus of claim 18, wherein in a second period subsequent to the first period, the first power voltage has the second voltage level and the control signal has the logic high level and wherein in a third period subsequent to the second period, the first power voltage has the first voltage level and the control signal has a logic low level.

20. The display apparatus of claim 16, wherein the pixel circuit is disposed on a silicon-based substrate.

* * * * *